United States Patent [19]

Conaway

[11] Patent Number: 4,989,684
[45] Date of Patent: Feb. 5, 1991

[54] SUSPENSION DEVICE FOR THE CAB OF A TRUCK VEHICLE

[76] Inventor: Richard Conaway, 3327 Highcliff Rd., Riverside, Calif. 92506

[21] Appl. No.: 385,281

[22] Filed: Jul. 25, 1989

[51] Int. Cl.$^5$ .......................... B60G 17/00; F16F 9/00
[52] U.S. Cl. .................................. 180/89.15; 296/190
[58] Field of Search ............. 180/89.12, 89.13, 89.14, 180/89.15, 89.16; 296/35.1, 190; 188/299; 267/64.11, 64.16; 280/688, 804, 702

[56] References Cited

U.S. PATENT DOCUMENTS

| | | | |
|---|---|---|---|
| 3,797,883 | 3/1974 | Steiner et al. | 180/89.15 |
| 3,944,017 | 3/1976 | Foster | 180/89.15 |
| 4,488,613 | 12/1984 | Marjoram | 180/89.15 |
| 4,513,845 | 4/1985 | Stephens et al. | 180/89.15 |
| 4,807,713 | 2/1989 | Smith et al. | 180/89.14 |

Primary Examiner—Richard A. Bertsch
Attorney, Agent, or Firm—Frederick Gotha

[57] ABSTRACT

An improved vibration dampening and shock absorber suspension device for the cab of a truck vehicle is set forth having a base member adapted for mounting to the truck frame and an impact plate adapted for attachment to the truck cab where the impact plate has a lateral dimension which is less than the lateral distance between the side beams of the truck frame. Interposed between the base member and the impact plate is a pair of air springs which are maintained at a constant height by a height control valve. A pair of hydraulic shock absorbers are pivotally connected to both the impact plate and base member where the central axis of the shock absorbers form the opposite sides of a trapezoid.

11 Claims, 3 Drawing Sheets

SUSPENSION DEVICE FOR THE CAB OF A TRUCK VEHICLE

FIELD OF THE INVENTION

This invention relates to a suspension device for the cab of a truck vehicle for supporting the cab on the truck chassis to dampen vibration and shock experienced by the truck vehicle thereby enhancing driver comfort and reducing driver fatigue.

BACKGROUND OF THE INVENTION

To provide comfort for truck drivers and reduce driving fatigue experienced by operators of truck vehicles, it is desirable to suspend the operator's cab by utilizing a vibration dampening and shock absorption device intermediate the truck chassis and cab which reduces the shock, vibration and consequent pounding the driver experiences during the operation of the vehicle. Additionally, the continued application of vibration and shock forces to the cab results in structural damage which ultimately results in increased maintenance costs.

The load carried by a truck vehicle is supported by the frame which is resiliently carried by suspension springs and supported by the truck wheels. Suspension springs have a high rate of stiffness which makes the ride more jarring on the operator of the vehicle and to dampen the vibration and shock transmitted to the cab, suspension systems have been employed utilizing conventional hydraulic automotive shock absorbers and air springs to dampen jounce and rebound movement of the cab with respect to the truck frame. Typically in the prior art, the air springs and shock absorbers were connected directly to the longitudinal side beam members of the truck frame such that the forces transmitted to the cab were at points remotely located from the cab center of gravity and consequently resulted in substantial rolling movements and cab sway. For example, in U.S. Pat. No. 3,944017 issued Mar. 16, 1976 a suspension device for a truck cab is disclosed where air springs are used which have a relatively low spring rate to isolate the jounce and vibration of the truck frame from the cab. Shock absorbers are also utilized which contain internal jounce and rebound bumpers that limit the extent of vertical movement of the cab with respect to the truck frame. The air springs are shown to be oppositely mounted immediately above the truck frame and located in direct vertical alignment with the frame. The shock absorbers are also oppositely mounted but with central axis extending in an outward direction from the vertical axis of the frame member where the central axes of the shock absorbers are inclined to the displacement axes of the air springs. Thus, in U.S. Pat. No. 3,994,017, and similarly in the prior art, the forces transmitted to the cab by the air springs and shock absorbers are at a substantial distance from the center of gravity of the cab thereby causing increased shock, lateral sway and rolling. Consequently, the driver experiences greater discomfort and the cab itself sustains higher force load levels which ultimately results in structural failure.

SUMMARY OF THE INVENTION

There is, therefore, provided according to the present invention, an improved vibration dampening suspension device for truck vehicle cabs which substantially reduces vibration and shock forces experienced by the truck driver. The improved device not only reduces driver fatigue but also minimizes the structural damage to the truck cab.

The present invention is directed to an improved vibration dampening suspension device composed of a base member which is a rigid body and is adapted for fitting to the frame of the truck vehicle. The base member is symetrical about a reference axis. A pair of hydraulic shock absorbers preferably of 1 3/16 inch bore are oppositely mounted to the base member and laterally and equally spaced from the reference axis. The central axes of the shock absorbers are inclined inwardly toward the reference axis so as to form the opposite sides of a trapezoid. The shock absorbers used in the present invention are sold under the trademark "Gabriel" and are manufactured by Gabriel Shock, a division of Marymont Corporation, and are of the type which dampen sixty percent of the amplitude of vibration under tensile load conditions.

The invention further incorporates an impact plate which is a rigid body adapted for attachment to the cab of the truck vehicle where the impact plate is axially spaced from and substantially parallel to the base member. The lateral dimension of the impact plate is less than the lateral distance between the side beams of the truck frame. Vibration and shock forces experienced by the truck frame are transmitted to the cab through the impact plate. One end of each of the shock absorbers is pivotally mounted to the impact plate such that the lateral distance between the shock absorber pivot points on the impact plate is less than the lateral distance between the shock absorber pivot points on the base member.

A pair of air springs, identified by the trademark "Super-Cushion", Part Number IS5, manufactured by Goodyear Tire and Rubber Company, are located intermediate the base member and impact plate where the air springs have a displacement axis which is substantially parallel to the reference axis of the base plate. A zero delay height control valve is mounted to the base member for maintaining the air springs at a pre-selected height, preferably 6.5 inches. The shock absorbers and air springs are located substantially inboard of the truck frame and are symetrically disposed about the reference axis of the base member. Although not normally in contact with the impact plate, a pair of rubber snubbers are symetrically located on the base plate which limit the vertical displacement of the impact plate if failure occurs in the air spring system or during excessive compressive loading. Thus the moments of the shock and vibration forces transmitted through the impact plate about the center of gravity of the truck cab are substantially reduced which results in greater driver comfort and less structural stress on the cab.

In another embodiment of the invention, one air spring is utilized where the displacement axis of the air spring substantially coincides with the reference axis of the base member.

As can be appreciated, the suspension device according to the present invention is inexpensive to manufacture, reduces the maintenance required on the cab by substantially reducing the shock, vibration and pounding associated with the operation of a truck, and substantially reduces the physical problems associated with the vibration and shock forces a driver ordinarily experiences when operating a truck. The simple construction of the suspension device permits adaptation to different types of truck vehicles and cab configurations.

BRIEF DESCRIPTION OF THE DRAWINGS

These and other features and advantages will become appreciated as the same become better understood with reference to the following specification, claims and drawings wherein:

DETAILED DESCRIPTION

Figure 1:
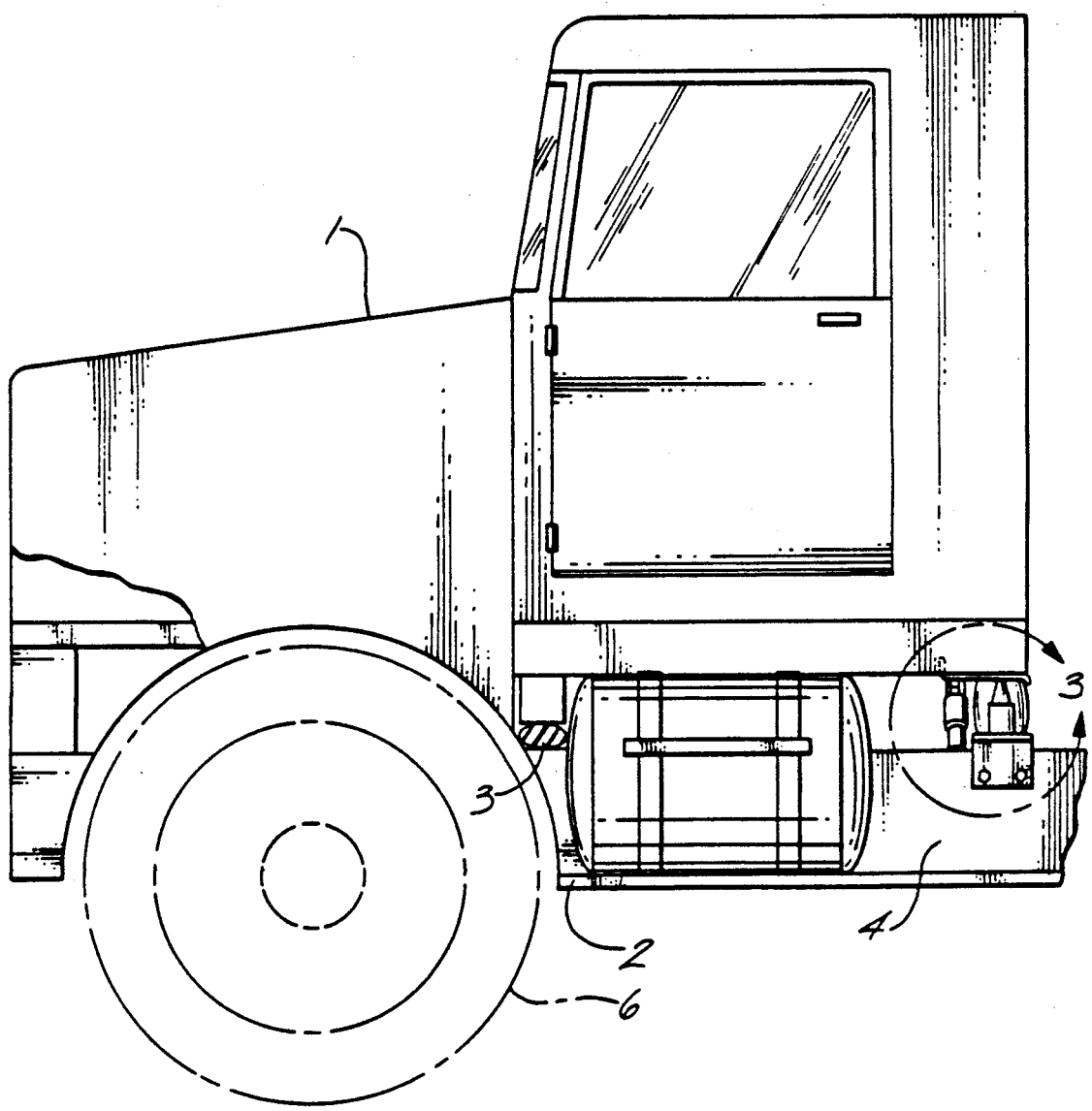
FIG. 1 is a side illustration of the truck vehicle and suspended cab according to the present invention.

Referring to FIG. 1, a side view is shown of the truck cab mounted to the truck frame 2. There are numerous methods for mounting the forward portion of a truck cab to the frame. For the purpose of illustrating the present invention, the forward portion of cab 1 is connected to the frame 2 by interposing between the cab and the frame an elastomeric or rubber donut 3 which serves to dampen the vibration and shock transmitted to the cab. The connection of the forward portion of the truck cab to the truck frame 2 utilizes standard fastening methods which are common in the trucking industry. The rear of cab 1 is suspended from the truck frame 2 by an improved suspension system which is more particularly described in FIG. 2.

Figure 2:
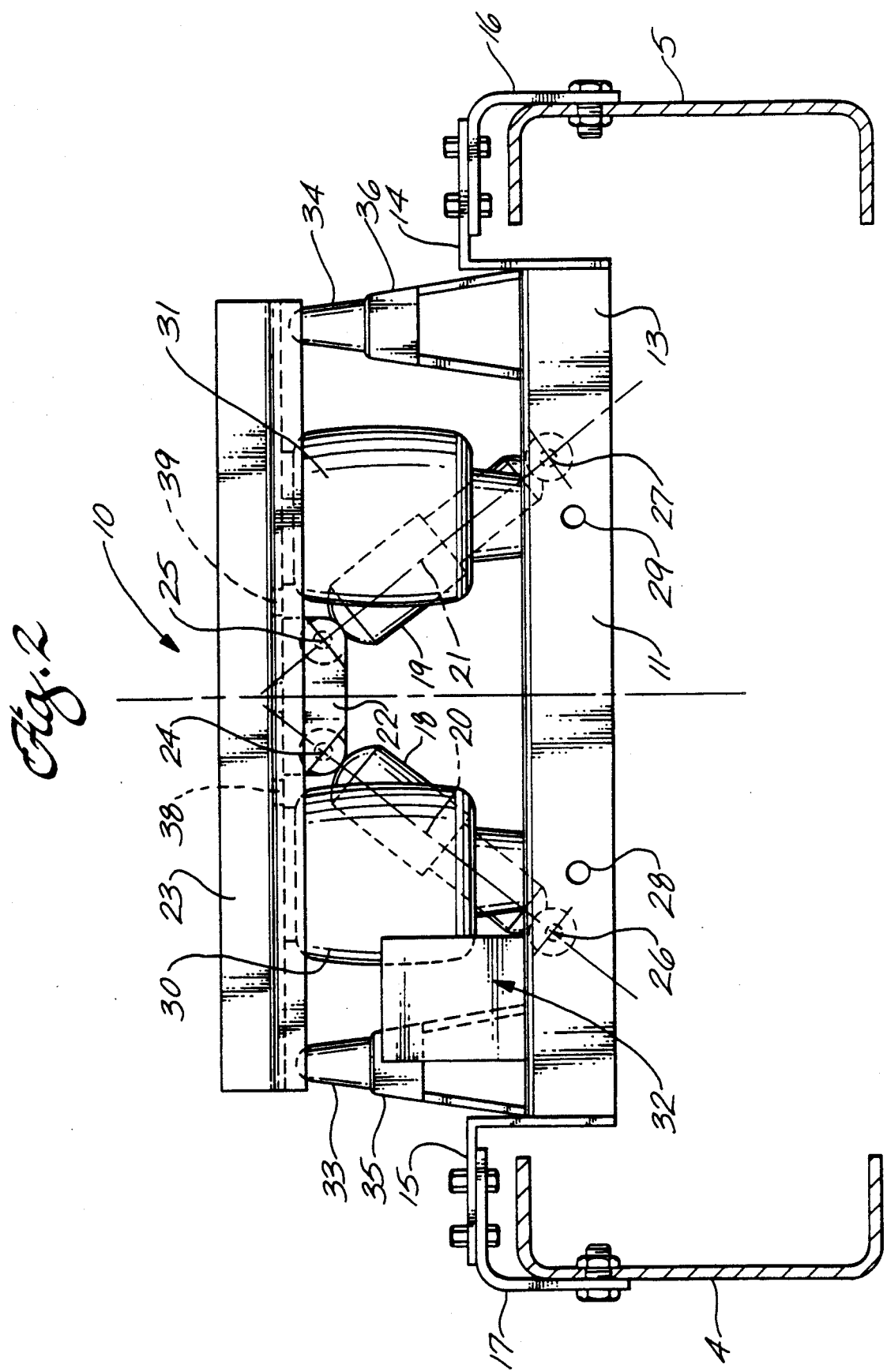
FIG. 2 is a rear view of the present invention with the truck chassis shown in cross-section.

As shown in FIG. 2, which is a rear view of the assembly of the cab suspension system 10, a base member 11 has a reference axis 12 about which cab suspension assembly 10 is symetrical. Base member 11 is bolted by conventional means to side beam 4 and side beam 5 of the truck frame 2. Base member 11 is comprised of a channel beam 13 extending laterally from reference axis 12 where the ends of the channel beam are rigidly welded to angle brackets 14 and 15 Which in turn are bolted to rear cab bracket mounts 16 and 17. In the disclosed embodiment of the invention, rear cab bracket mounts 16 and 17 are bolted to the truck frame. Thus, base member 11 forms a rigid platform interconnecting side beam 4 and side beam 5 of the truck frame 2 such that the shock and vibration forces experienced by the truck frame are transmitted directly to base member 11.

Pivotally mounted to base member 11 are the first ends of hydraulic shock absorbers 18 and 19 which have, in the preferred embodiment of the invention respectively, central axis 20 and 21. The shock absorbers are identified by the trademark "Gabriel" and are manufactured by Gabriel Shock, a division of Marymont Corporation, and are of 1 3/16 inch bore for use with cab suspension systems. Hydraulic shock absorbers having bore sizes ranging from 1 inch to 1 1/2 inches may also be utilized in the present invention. Preferably shock absorbers 18 and 19 are of the type which dampen sixty percent of the amplitude of vibration when the shock absorber is subject to tensile loading along the central axis and forty percent of amplitude when loaded compressively along the central axis. The second ends of shock absorbers 18 and 19 are pivotally mounted to U-shaped channel member 22 which is welded to impact plate 23. The lateral distance between the pivot points 24 and 25 of the second ends of shock absorbers 18 and 19 is less than the lateral distance between the pivot points 26 and 27 of the first ends of shock absorbers 18 and 19. Thus, the lateral distances between pivot points 24 and 25 and pivot points 26 and 27 form the opposite sides of a trapezoid with the central axes 20 and 21 of the shock absorbers forming the opposite sides of the trapezoid.

To accommodate different truck frame configurations, base member may have a plurality of adjustment aperatures. In the present invention, aperatures 28 and 29 permit the angle between the reference axis and the central axis of the shock absorbers to be decreased. For example, where the truck frame is made of aluminium and assuming identical forces acting on the truck frame, the amplitude of vibration in the vertical direction may be greater than the amplitude for a truck frame made of steel. To accommodate for these differing frame configurations the base member 11 as shown in FIG. 2 has additional aperatures 28 and 29 to permit the first end of shock absorbers 18 and 19 to be pivotally mounted at these aperatures so as to decrease the angle of the central axis of the shock absorbers with the reference axes of the base member thereby permitting the shock absorbers to more efficiently dampen vertical vibration of the truck frame. Additional aperatures located on the base member along the arc generated by a radius length equal to the distance between opposing pivot points of the shock absorbers, not shown, may also be used to increase the angle of the central axes of the shock absorbers with the reference axis to more efficiently dampen the lateral or horizonal vibration components.

Interposed between impact plate 23 and base member 11 are a pair of air springs 30 and 31 which in the preferred embodiment of the invention are manufactured by Goodyear Tire and Rubber Company and identified by the trademark "Super-Cushion", Part Number IS5, air springs. A height control valve 32 is mounted to base member 11 for maintaining the air springs at a constant height of 6.5 inches regardless of the vertical forces experienced by the suspension system 10. Although not shown, the height control valve incorporates a control rod which is mounted to the impact plate and detects height changes of the air springs. These height changes are relayed to the height control valve 32 which either admits or exhausts air in order to maintain a constant height of 6.5 inches. The air springs used in the present invention may be set to operate between pre-selected heights of 6.2 inches to 7.2 inches. Any standard height control valve having a zero delay may be utilized with the air springs. The height control valve 32 which is preferred in the practice of the present invention is manufactured by Nelson Metal Products Corporation and may be utilized with any type of air spring. U.S. Pat. No. 3,635,460 describes the structure and operation of the height control valve and is incorporated herein by reference.

In another embodiment of the invention, not shown, one air spring may be utilized where the displacement axis of the air spring substantially coincides with the reference axis 12 of the base member 11. The height control valve in this embodiment also maintains the air spring at a preselected height.

The vertical displacement of the impact plate 23 is limited by rubber snubbers 33 and 34 which are mounted to snubber towers 35 and 36. Snubbers 33 and 34 are preferably made of rubber but may be made of other materials provided such materials have elastomeric properties. Snubber towers 35 and 36 are rigid bodies which are fixed to channel beam 13 of the base member 11.

Figure 3:
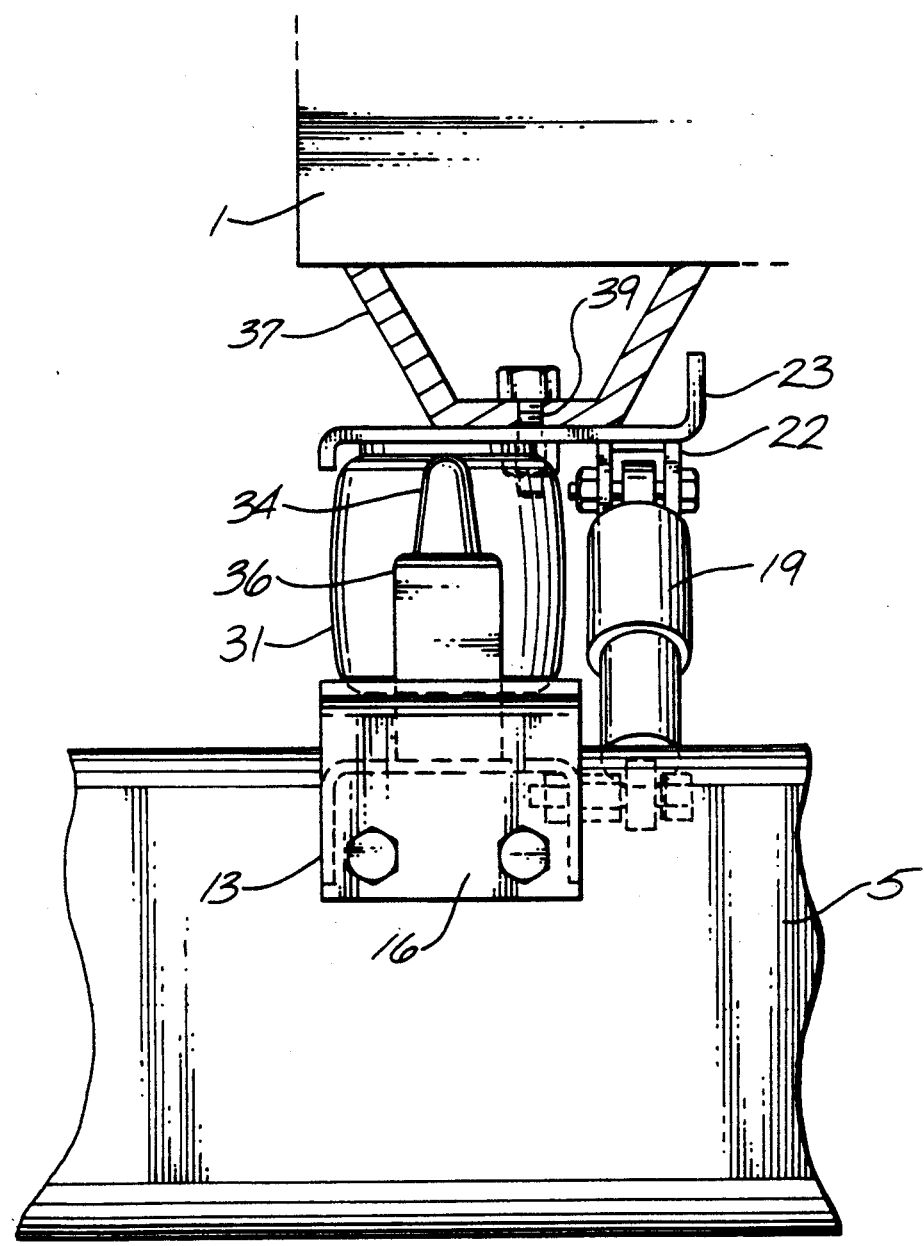
FIG. 3 is an expanded side view of the present invention as depicted in FIG. 1.

Referring now to FIG. 3 a typical connection of the cab 1 to impact member 23 is illustrated. As can be seen, a V-shaped channel member 37 supports the base of truck cab 1 and is bolted to impact plate 23 through holes 38 and 39 contained in the impact plate.

In operation, the passage of truck wheels 5 over a highway will cause the transmission of shock and vibration forces from the truck frame 2 to the base member 11. Located laterally inward from the side beams 4 and 5 of the truck frame are hydraulic shock absorbers 18 and 19 which have central axis inclined to the reference axis 12 of the base member 11. The ends of the shock absorbers are pivotally mounted to the base member 10 and the impact plate 23. The lateral distance between the pivot points 24 and 25 located on the impact plate is less than the lateral distance between pivot points 26 and 27 on the base member. Thus, the central axis of the shock absorbers form the opposite sides of a trapezoid with the distance between pivot points 26 and 27 forming the base of the trapezoid. The resultant of forces transmitted to the truck cab by the shock absorbers is directed inwardly in the direction of the center of gravity of the cab which minimizes the sway and rolling of the cab. Acting in conjunction with the shock absorbers, a pair of air springs 30 and 31 also located laterally inward from the side beams of the truck frame dampen the vertical vibration transmitted by the frame to the cab. The forces therefore creating rolling action about the center of gravity of the cab act through shortened moments arms and therefore the rolling moments are reduced. The suspension system may be modified to accommodate different frame configurations by adjusting the pivot points at aperatures 28 and 29 of the base member 11. The adjustment permits more efficient dampening of the vertical amplitudes of the truck frame vibrations and shock loads.

In the embodiment of the invention utilizing one air spring, the displacement axis of the air spring substantially coincides with the reference axis of the base member and the forces transmitted to the cab by the spring act through a limited lateral distance from the center of gravity of the truck cab. Thus, the sway of the cab is essentially reduced by the forces transmitted through the air spring and the shock absorbers acting through reduced moment arms about the center of gravity of the cab.

While I have shown a preferred embodiment of the present invention, it is to be understood that it is subject to many modifications without departing from the scope and spirit of the claims as recited herein.

What is claimed is:

1. An improved vibration dampening suspension device for the cab of a truck vehicle comprising:
   (a) a base member having a reference axis and adapted for mounting to the frame of said truck vehicle;
   (b) a pair of hydraulic shock absorbers having a central axis and a first and second end, where said shock absorbers are oppositely and laterally spaced from said reference axis and where said first end of each said shock absorber is pivotally mounted to said base member such that the said central axes of said shock absorbers are inclined toward said reference axis so as to form the opposite sides of a trapezoid;
   (c) an impact plate adapted for attachment to said cab and having a lateral dimension which is less than the lateral distance between the side beams of the truck frame where said impact plate is axially spaced from and substantially parallel to said base member for transmitting dampened vibration and shock forces to said cab, said second ends of said shock absorbers are pivotally mounted to said impact plate such that the lateral distance between said second ends is less than the lateral distance between said first ends;
   (d) a pair of air springs oppositely spaced from said reference axis and mounted to said base member and said impact plate where said air springs have a displacement axis substantially parallel to said reference axis; and,
   (e) a height control valve associated with said air springs for maintaining said air springs at a constant pre-selected height.

2. The Improved Suspension Device recited in claim 1 further comprising a pair of snubbers carried by said base member for limiting the vertical displacement of said impact plate.

3. An improved vibration dampening suspension device for the cab of a truck vehicle comprising:
   (a) a base member having a reference axis and adapted for mounting to the frame of said truck vehicle;
   (b) a pair of hydraulic shock absorbers having a central axis and a first and second end, where said shock absorbers are oppositely and laterally spaced from said reference axis and where said first end of each said shock absorber is pivotally mounted to said base member such that the said central axes of said shock absorbers are inclined toward said reference axis so as to form the opposite sides of a trapezoid;
   (c) an impact adapted for attachment to said cab and having a lateral dimension which is less than the lateral distance between the side beams of the truck frame where said impact plate is axially spaced from and substantially parallel to said base member for transmitting dampened vibration and shock forces to said cab, said second ends of said shock absorbers are pivotally mounted to said impact plate such that the lateral distance between said second ends in less than the lateral distance between said first ends;
   (d) a pair of air springs oppositely spaced from said reference axis and mounted to said base member and said impact plate where said air springs have a displacement axis substantially parallel to said reference axis; and
   (e) a height control valve associated with said air springs for maintaining said air springs at a constant preselected height, said base member further comprises adjustment means for selectively changing the angle of inclination of said central axis of said shock absorbers with said reference axis.

4. The Improved Suspension Device recited in claim 3 further comprising a pair of snubbers carried by said base member for limiting the vertical displacement of said impact plate.

5. The improved suspension for mounting to the rear of a truck cab of the type having a pair of hydraulic shock absorbers having a central axis, a pair of air springs, and a height control valve for maintaining the air springs at a pre-selected height wherein the improvement comprises a base member having a reference axis and adapted for mounting to the frame of the truck, where said shock absorbers are oppositely and laterally spaced from said reference axis and where the first end of each said shock absorber is pivotally mounted to said base member such that said central axes of said shock absorbers are inclined toward said reference axis so as to form the opposite sides of a trapezoid, an impact plate adapted for attachment to said truck cab and having a lateral dimension which is less than the lateral distance between the side beams of the truck frame, said impact plate axially spaced from and substantially parallel to said base member for transmitting vibration and shock forces to said truck cab, where said second ends of said shock absorbers are pivotally mounted to said impact plate such that the lateral distance between said second ends of said shock absorbers is less than the lateral distance between said first ends, where said air springs are oppositely spaced from said reference axis and mounted to said base member and said impact plate, said air springs having a displacement axis substantially parallel to said reference axis.

6. The improved suspension device for mounting to the rear of a truck cab recited in claim 5 further comprising a pair of snubbers carried by said base member for limiting the vertical displacement of said impact plate.

7. The improved suspension device for mounting to the rear of a truck cab of the type having a pair of hydraulic shock absorbers having a central axis, a pair of air springs, and a height control valve for maintaining the air springs at a pre-selected height wherein the improvement comprises a base member having a refernece axis and adapted for mounting to the frame of the truck, where said shock absorbers are oppositely and laterally spaced from said reference axis and where the first end of each said shock absorber is pivotally mounted to said base member such that said central axes of said shock absorbers are inclined toward said reference axis so as to form the opposite sides of a trapezoid, an impact plate adapted for attachment to said truck cab and having a lateral dimension which is less than the lateral distance between the side beams of the truck frame, said impact plate axially spaced from and substantially parallel to said base member for transmitting vibration and shock forces to said truck cab, where said second ends of said shock absorbers are pivotally mounted to said impact plate such that the lateral distance between said second ends of said shock absorbers is less than the lateral distance between said first ends, where said air springs are oppositely spaced form said reference axis and mounted to said base member and said impact plate, said air springs having a displacement axis substantially parallel to said reference axis, said base member further comprises adjustment means for selectively changing the angle of inclination of said central axis of said shock absorbers with said reference axis.

8. The improved suspension device for mounting to the rear of a truck cab recited in claim 7 further comprising a pair of snubbers carried by said base member for limiting the vertical displacement of said impact plate.

9. An improved vibration dampening suspension device for the cab of a truck vehicle comprising:
(a) a base member having a reference axis and adapted for mounting to the frame of said truck vehicle;
(b) a pair of hydraulic shock absorbers having a central axis and a first and second end, where said shock absorbers are oppositely and laterally spaced from said reference axis and where said first end of each said shock absorber is pivotally mounted to said base member such that the said central axes of said shock absorbers are inclined toward said reference axis so as to form the opposite sides of a trapezoid;
(c) an impact plate adapted for attachment to said cab and having a lateral dimension which is less than the lateral distance between the side beams of the truck frame where said impact plate is axially spaced from and substantially parallel to said base member for transmitting dampened vibration and shock forces to said cab, said second ends of said shock absorbers are pivotally mounted to said impact plate such that the lateral distance between said second ends is less than the lateral distance between said first ends;
(d) an air spring having a displacement axis located intermediate said base member and said impact plate where said air spring is mounted to said base member and to said impact plate and where said displacement axis substantially coincides with said reference axis;
(e) a height control valve associated with said air spring member for maintaining said air spring at a preselected height.

10. The improved suspension device recited in claim 9 wherein said base member further comprises adjustment means for selectively changing the angle of inclination of said central axes of said shock absorbers with said reference axis.

11. The improved suspension device recited in claim 9 further comprising a pair of snubbers carried by said base member for limiting the vertical displacement of said impact plate.

* * * * *